Oct. 1, 1963 W. S. SCHAILL 3,105,310

TACHISTOSCOPIC DEVICE

Filed Oct. 24, 1961

INVENTOR

WILLIAM S. SCHAILL

BY John Gibson Semmes

ATTORNEY

United States Patent Office 3,105,310

Patented Oct. 1, 1963

3,105,310

TACHISTOSCOPIC DEVICE

William S. Schaill, Bronxville, N.Y., assignor to The Reading Laboratory, Inc., New York, N.Y., a corporation of New York Filed Oct. 24, 1961, Ser. No. 147,226
3 Claims. (Cl. 35—35)

The present application relates to a tachistoscopic device or phrase-flasher used for momentary presentation of printed media in training courses.

Tachistoscopic devices are widely used in training for improvement in reading, perception, shorthand, foreign language, aircraft recognition and the like where the instantaneous recognition of printed media is desirable. Such devices normally include a housing with a viewing aperture and a spring urged shutter movable over the aperture. Conventional tachistoscopic devices have included complex articulated means for supporting the shutter upon the housing. These articulated means have increased the cost of production, as well as maintenance of the devices. Also, in several tachistoscopic devices the shutter mechanism itself can only be cocked by a withdrawing of the shutter from the housing, itself. Needless to say, the complexity of moving parts as well as any protuberance of the shutter mechanism from the housing are undesirable features in tachistoscopic devices. According to present education practices, tachistoscopic devices are often loaned to the student who may carry the device in his briefcase, utilizing the device on his own time in home or study. The present invention eliminates complex articulated arms and protuberances and because of its simplicity of moving parts is both economical and readily portable. The present device comprises a housing with viewing opening, a card shelf positioned beneath the housing, a mask supported upon the housing above the viewing opening and a shutter mechanism supported between the mask and housing. The shutter mechanism is movable over the viewing opening and is lockable in closed position by means of a unique inverted T-shaped handle which locks with the mask. As a result, there is provided a simplified tachistoscopic device.

Accordingly, it is an object of invention to provide a tachistoscopic device wherein the student can manipulate and lock the shutter trigger readily.

Another object of invention is to provide a tachistoscopic device for use in connection with cards bearing printed media which is easily repairable.

Another object of invention is to provide a tachistoscopic device which includes means for storage of cards used therein.

Additional objects of invention will become apparent from the ensuing specification and attached drawings wherein.

Figure 3:
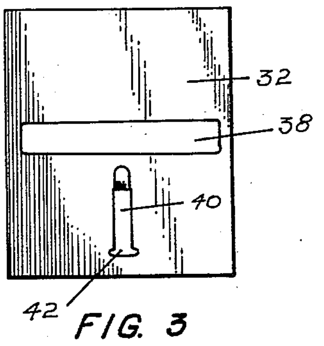
Figure 4:
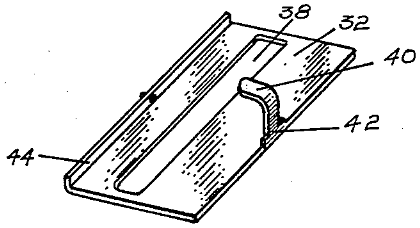
Figure 5:
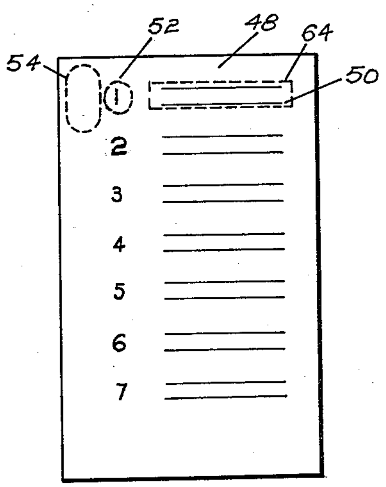

FIG. 3 is a top plan of the shutter showing the shutter opening 38 and shutter handle 40 of inverted T-shaped configuration, FIG. 4 is a perspective of shutter handle 40, and, FIG. 5 is a top plan view of a card used in the device and bearing numerically indexed lines of printed media. Areas of exposure through the card movement, card indexing, and card viewing apertures are depicted respectively by dotted lines 54 and 52 and 64.

Figure 1:
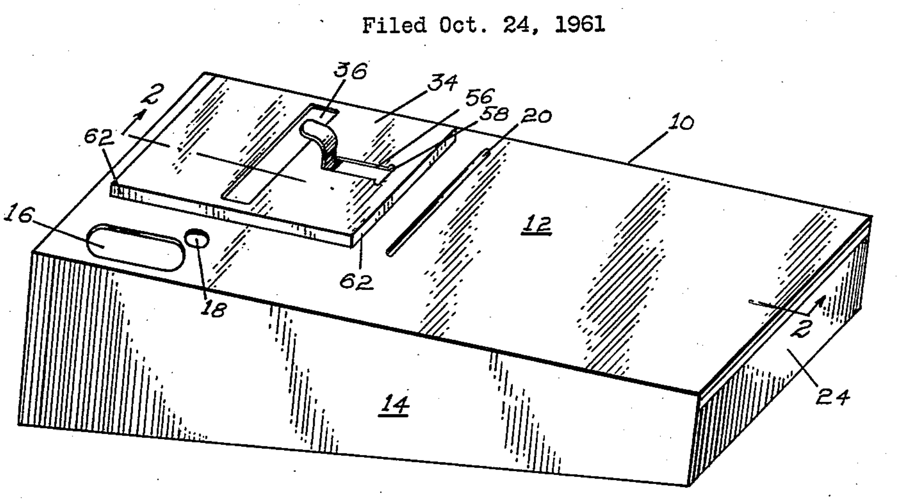
FIG. 1 is a perspective view of the phrase-flasher housing, showing card movement and card indexing apertures and the shutter mask 34 positioned on the housing top with shutter handle 40 extending therethrough.

In FIG. 1 open-ended housing 10 is indicated as comprising cover or top piece 12 and vertical sides 14. A masking element generally designated as 34 and embodying vertical sides 62 is shown positioned upon the housing above decorative lateral channel 20. In the housing adjacent the masking element 34 are card indexing aperture 18 and card movement aperture 16.

Figure 2:
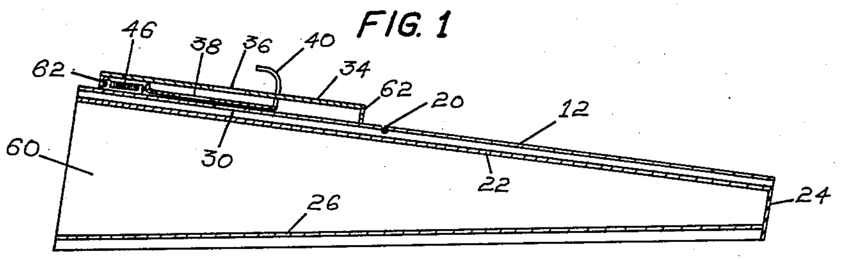
FIG. 2 is a longitudinal section of the device.

As indicated in FIG. 1, card viewing shelf 22 with vertical end portion 24 may be secured between the sides 14 beneath housing viewing aperture 30. Also, a card storage shelf 26 may be positioned between end 24 and sides 14. Consequently, the housing open-end 60 is available for presentation of cards to viewing shelf 22 and storage shelf 26. Mask 34 comprises viewing aperture 36 in registry with housing viewing aperture 30 and a shutter handle key hole channel 56 of inverted T-shaped configuration which provides lateral locking slots 58. Shutter 32, as illustrated in FIGS. 2–4 includes a shutter opening 38 and an inverted T-shaped shutter handle 40 which extends through shutter channel 56 and is bent towards viewing aperture 36. As will be apparent, the base portion 42 of the handle is of T-shaped configuration and lockable in mask slots 58. The forward end of the shutter 32 may be provided with a vertical flange 40 which acts as a guide between the top of the mask and housing top 12. A tension spring 46 may be used for connecting shutter 32 with the housing side 62. In use a card 48 bearing printed media 50 to be identified through the viewing opening is placed upon card shelf 22 so that the line-indexing numerals 52 are recognizable through indexing aperture 18. The shutter is cocked by pulling of handle 40 towards the T-shaped base 58 of channel 56 and is locked by lifting of the handle 40 so that the lateral elements 42 engage slot 58. The shutter is released by pushing downwardly at handle 40 so as to remove the lateral elements from the slots 58 and as a result the shutter opening 38 is urged by the spring 46 between the viewing openings. Shutter opening 38 is in registry with viewing openings 30 and 36 momentarily for a period of 1/50 of a second or the like. Manifestly, the shutter speed may be varied by varying the strength of spring 46. Card 48 is moved from index numeral to index numeral by the operator's using his index finger through index opening 16.

Manifestly, various modifications of the invention including altering of the keyhole channel shutter locking arrangement may be employed without departing from the spirit and scope of invention as defined in the subjoined claims.

I claim:

1. A tachistoscopic device comprising:

(*a*) a housing having vertical sides and card movement; card index and card viewing apertures in its top;

(*b*) a card viewing shelf supported beneath said apertures between the sides of said housing and upon one vertical end section of said housing secured between said housing sides;

(*c*) a card storage shelf secured beneath said viewing shelf and between said vertical sides and said vertical end of said card viewing shelf, (*d*) a card viewing mask partially covering said housing, said mask having vertically disposed sides and ends, a viewing aperture and a shutter handle slot with laterally disposed notches, said viewing apertures of said mask being in registry with said viewing aperture of said housing; and (*e*) a shutter secured at one end to said mask and positioned between both said viewing apertures and limited in movement by said vertically disposed side and ends, said shutter having a shutter opening movable between said viewing openings and a shutter handle of inverted T-shaped configuration extending through said shutter handle channel of said mask the inverted T-shaped base of said shutter handle being lockable within said laterally disposed notches of said shutter handle slot opening.

2. A tachistoscopic device as in claim 1, said mask sides being of sufficient height so that when said T-shaped base of said shutter handle is locked in said notches, the handle attached portion of said shutter is lifted from said housing top.

3. A tachistoscopic device as in claim 2 in combination with a card having printing media visibly indexed at all times through said indexing aperture and slidable by contact through said card movement aperture.

References Cited in the file of this patent

UNITED STATES PATENTS

| | | |
|---|---|---|
| 2,723,466 | Ott | Nov. 15, 1955 |
| 2,791,843 | Warren | May 14, 1957 |